United States Patent [19]

Kodama et al.

[11] 4,148,230

[45] Apr. 10, 1979

[54] EMISSION CONTROL SYSTEM DEPENDENT UPON TRANSMISSION CONDITION IN A MOTOR VEHICLE

[75] Inventors: Masayuki Kodama, Tokyo; Toshio Kobayashi, Mitaka, both of Japan

[73] Assignee: Fuji Heavy Industries Co., Ltd., Tokyo, Japan

[21] Appl. No.: 860,575

[22] Filed: Dec. 14, 1977

[30] Foreign Application Priority Data

Dec. 14, 1976 [JP] Japan .............................. 51-149355
Dec. 14, 1976 [JP] Japan .............................. 51-166676[U]
Dec. 14, 1976 [JP] Japan .............................. 51-166677[U]

[51] Int. Cl.[2] .................... B60K 41/18; F02B 29/00; F02B 33/00

[52] U.S. Cl. .............................. 74/859; 123/119 A; 123/119 EC

[58] Field of Search .............................. 74/857, 859; 123/119 EC, 119 A

[56] References Cited

U.S. PATENT DOCUMENTS

| | | | |
|---|---|---|---|
| 3,744,346 | 7/1973 | Miner et al. | 74/859 X |
| 3,789,702 | 2/1974 | Price | 74/859 |
| 3,868,868 | 3/1975 | Chana | 74/859 X |
| 3,956,947 | 5/1976 | Leising et al. | 74/866 |
| 4,058,098 | 11/1977 | Onaka | 123/119 A |
| 4,073,202 | 2/1978 | Aoyama et al. | 123/119 A X |

*Primary Examiner*—Lance W. Chandler
*Attorney, Agent, or Firm*—Birch, Stewart, Kolasch & Birch

[57] ABSTRACT

An emission control system for a motor vehicle equipped with an automatic transmission having a band servo system including switching means for detecting the state of the band servo system and two vehicle speed switches respectively susceptible to two different vehicle speeds $V_1$ and $V_2$ ($V_1 < V_2$). The emission control system includes means for enriching the air-fuel ratio of the air-fuel mixture in an intake passage of the engines and exhaust gas recirculating means are so arranged that the air-fuel ratio of the air-fuel mixture is normally set on the rich side and the EGR ratio is made high. Correspondingly in the high driving range with a vehicle speed of lower the $V_2$ the EGR ratio is made low, and in the high driving range with a vehicle speed of at least $V_2$ the EGR ratio is made low and the air-fuel ratio is released from being set on the rich side.

6 Claims, 6 Drawing Figures

EMISSION CONTROL SYSTEM DEPENDENT UPON TRANSMISSION CONDITION IN A MOTOR VEHICLE

BACKGROUND OF THE INVENTION

1. Field of the Invention

The present invention relates to an emission control system for a motor vehicle. More particularly, it relates to a system for emission control for a motor vehicle equipped with an automatic transmission having a band servo and planetary gear assembly. According to the invention the high driving range in the automatic transmission is detected by means of the band servo and vehicle speed switches, and emission control is carried out depending upon the driving ranges of the automatic transmission and the vehicle speed.

In another aspect, the present invention relates to a device for detecting the high driving range in an automatic transmission. In a further aspect, the present invention relates to a device for detecting the state of the operation of a band servo in an automatic transmission having such a system.

2. Description of the Prior Art

In order to reduce the content of NOx components in the exhaust gas from motor vehicle engines, a method is known in the prior art wherein the air-fuel ratio of the intake air-fuel mixture to be sucked into the engines is set richer or leaner than the stoichiometric air-fuel ratio. It is also known that similarly effective for the same purpose is an exhaust gas recirculation (hereinafter referred to as "EGR") method wherein a part of the exhaust gas is recirculated to the intake system whereby the combustion temperature in combustion chamber of the engines is lowered.

However, if EGR is carried out with a high EGR ratio (that is a ratio by weight of a recirculated exhaust gas to the total weight of the intake air-fuel mixture introduced into the engines), the driving force is lowered, resulting in a poor drivability and a poor fuel economy. Setting of the air-fuel ratio on the rich side is also an incompatible factor which reduces the fuel consumption efficiency.

Emission control has heretofore been carried out by practicing EGR and the enriching of the air-fuel ratio, alone or in combination, depending upon particular conditions under which the engines are operating. For example, when the high driving range is detected, EGR is stopped and the setting of the air-fuel ratio on the rich side is released because in this detected range the air pollution problem is not so serious that it is rather desired to enhance the fuel economy and engine torque.

However, with respect to an automatic transmission unit it is generally difficult to detect the high driving range. A typical prior art proposal for detecting the high driving range is based on the detection of the change in regulated pressure of the hydraulic passages due to shifting of the automatic transmission unit. However, the detection of pressure requires devices and instruments of high precision, and is not preferred in view of reduced reliability and durability of the whole system including such a mechanism. Even with such system, precise separation and detection of the driving ranges was not easy.

Furthermore, in the high driving range with a relatively low vehicle speed, some measures must be taken for emission control, and abrupt change in both the EGR and air-fuel ratio is not preferred from the view point of smooth operation. Accordingly, it is desirable in this range to stop only EGR and to keep the air-fuel ratio on the rich side so as to enhance the engine torque and to reduce NOx level in the exhaust gas.

SUMMARY OF THE INVENTION

It is an object of the present invention to provide an improved emission control system for a motor vehicle equipped with an automatic transmission unit, without suffering from the above-discussed drawbacks and disadvantages of the prior art.

A further object of the present invention is to provide an emission control system for a motor vehicle equipped with an automatic transmission wherein the high driving range and the vehicle speed are detected, and, depending upon the detected driving range and vehicle speed, the driving conditions are set in such a manner that (1) in the low and intermediate driving ranges where control of NOx is of most importance, the EGR ratio is set high and the air-fuel ratio is set on the rich side; (2) in the high driving range where the generation of NOx does not pose a serious problem, the EGR ratio is made low thereby to enhance the fuel economy and the drivability, and; (3) in the high driving range with a vehicle speed higher than a predetermined value, the above-mentioned setting of the air-fuel ratio on the rich side is released so as to further enhance the fuel economy.

A still further object of the present invention is to provide an emission control system for a motor vehicle equipped with an automatic transmission unit wherein the detection of the high driving range is carried out using reliable mechanical and electrical detecting means comprising a combination of a switch for detecting states of operation of a band servo system and vehicle speed switches.

A special object of the invention is to provide a device for detecting states of operation of a band servo system.

According to the present invention there is provided an emission control system for a motor vehicle having an engine and equipped with an automatic transmission having a band servo wherein a brake band may make a part of a planetary gear assembly tightened or released by the action of a servo piston, said system for emission control comprising: switching means for detecting the tightening state of the brake band where the transmission is in the intermediate driving range and for detecting the releasing state of the brake band where the transmission is in the low and high driving ranges, a first vehicle speed switch for detecting whether the vehicle speed is equal to or higher than a first predetermined value, a second vehicle speed is switch for detecting whether the vehicle speed equal to or higher than a second predetermining value which is higher than said first predetermining value, means for enriching the air-fuel ratio of an air-fuel mixture in an intake passage of the engine, and exhaust gas recirculating means for recirculating a part of the exhaust gas into the intake passage, the switches and means being so arranged that, when the first vehicle speed switch detects the vehicle speed which is lower than the first predetermined value, the air-fuel ratio of the air-fuel mixture in the intake passage is set richer than the stoichiometric air-fuel ratio by means of the enriching means and at the same time the exhaust gas recirculation ratio is made high by means of the the exhaust gas recirculating means; when the switching means has detected the low and high driving ranges, and the first vehicle switch has detected the vehicle speed which is equal to or higher than the first predetermined value, the exhaust gas recirculation ratio is made low, and; when the switching means has detected the low and high driving ranges, and the second vehicle speed switch has detected the vehicle speed which is equal to or higher than the second predetermined value, the enriching action of the means for enriching the air-fuel ratio is released.

BRIEF DESCRIPTION OF THE DRAWINGS

The invention will now be described with reference to the accompanying drawings, in which.

DETAILED DESCRIPTION OF THE INVENTION

Figure 1:
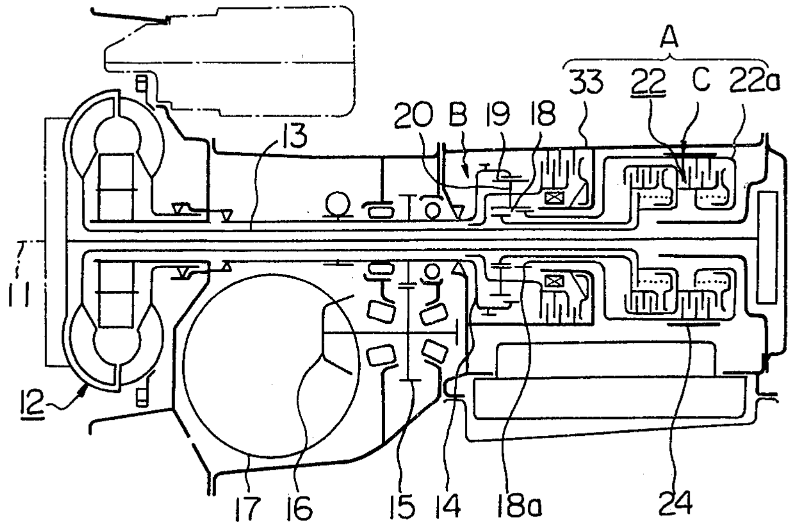
FIG. 1 is a diagramatic vertical cross-sectional view showing a whole automatic transmission for illustrating a known band servo which may be used in the present invention.

In the automatic transmission illustrated in FIG. 1, an engine torque which is transmitted to a crank shaft 11 is transmitted via a torque converter 12 to a turbine shaft 13. The torque is further transferred or not transferred by means of the function of various clutch or brake mechanisms A to planetary gear assembly B where the torque is transmitted to a planetary output gear 14 at an arbitrary level. Thereafter to drive wheels (not shown) via a reduction gear 15, a drive pinion 16, and a crown gear 17 which constructs a differential gear train.

In the general automatic transmission as described above at least two conditions are given by shift elements to sun gears 18, planetary gears 19, an output gear 14 and a carrier 20 for supporting the planetary gears 19 in the planetary gears assembly B whereby an output, which varies depending upon the given conditions, may be obtained from the output gear 14. The band servo C is one of the shift elements. In the band servo C, a reverse clutch drum 22*a* is connected with a reverse sun gear 18*a;* Further one of the sun gears 18 in the planetary gear units B, is, at a reverse clutch section, securely confined by a brake band 24, and made rotable by releasing the confinement. The D3 (third forward driving or high driving) range is the state at which the brake band 24 is released and the driving force of the engines is transmitted from the turbine shaft to the reverse sun gear 18*a* connected with the reverse clutch drum 22*a*. The D1 (first forward driving or low driving) range is the state at which the brake band 24 is released but a reverse clutch 22 is not connected with the sun gear 18*a*. The D2 (second forward driving or intermediate driving) range is the state at which the reverse sun gear 18*a* is fixed with the reverse clutch drum 22*a* confined by a brake band 24. Thus, the state at which the brake band 24 is released is in the D1 or D3 range, whereas the state at which the brake band 24 is confined is the D2 range.

Figure 2:
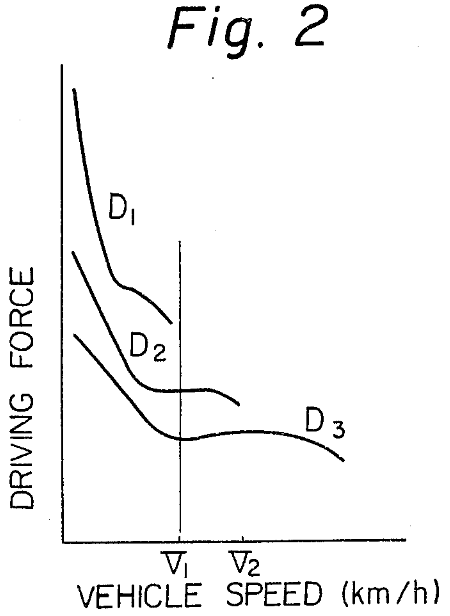
FIG. 2 is a typical graph illustrating the driving forces in respective forward driving range D1, D2 and D3, plotted against the vehicle speed.

It will be understood from FIG. 2 that in the D1 range the vehicle is driven with a vehicle speed lower than a certain level (within the range from about 40 to 60 km/hr). This fact is utilized in the invention in order to separately detect the D1 and D3 ranges which have been unseparated as detected from the operation of the brake bands, whereby a separate detection of the D3 range may be ensured.

Figure 3:
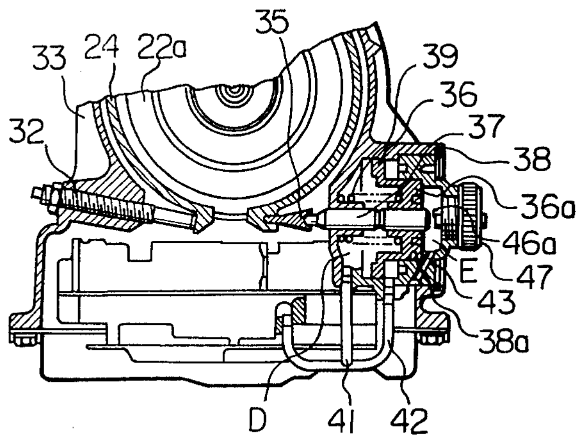
FIG. 3 is a vertical cross-section showing one embodiment of switching means in accordance with the invention.
Figure 4:
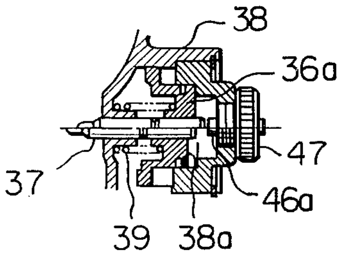
FIG. 4 is an enlarged view showing the essential parts of the switching means as shown in FIG. 2.

Referring to FIGS. 3 and 4, which illustrate a device in accordance with the invention for detecting the high speed range, a brake band 24 is secured at one end via a band adjusting screw 32 as an anchor to a transmission case 33. The band adjusting screw 32 may be axially displace by its rotation through the transmission case 33, so that the position of that end of the brake band 24 may be adjusted. The brake band 24 envelops a reverse clutch drum 22*a* which is connected with a reverse sun gear 18*a* of a planetary gear unit B in the automatic transmission. The brake band 24 has a free end, which is supported via a band strut 35 by a piston rod 37 of a servo-piston 36 with spherical contact. The piston rod 37 is slidably mounted through a servo-cylinder 38 and transmits the a stroke of the servo-piston 36 to the free end of the brake band 24. The servo-piston 36 having a central small diameter portion 36*a*, divides the interior of the servo-cylinder 38 into a chamber D provided with a return spring 39 and an opposing chamber E, and is slidable in such a manner that when the small diameter portion 36*a* has come to the chamber E side it is caused to fit a small diameter portion 38*a* of the servo-cylinder 38. The chamber D and E are hydraulic pressure chambers for confinement and relief respectively communicating with regulated pressure passages 41 and 42 of the automatic transmission. The small diameter portion 38*a* of the servo-cylinder is communicated with a drain hole 43.

The piston rod 37 is screwed to the servo-piston 36. In accordance with the invention switching means 47 is securely mounted on an outer end wall of the chamber E, said means 47 is capable of making a switch of a detecting circuit conductive to close the circuit when the servo-piston 36 has completed a stroke towards the chamber E side and at the end of that stroke a contact element 46*a* is brought into contact with and pressed by the piston rod 37.

The band servo and the switching means operate as follows.

D1 range

Because no hydraulic pressure oil is introduced into both chambers D and E, the servo-piston 36 is urged towards the chamber E side by a resilient force of the return springs 39. Thus, the servo-piston 36 presses a contact element 46*a* so as to turn the switching means 47 ON.

Consequently, the brake band 24 spreads out by its own resiliency to release the reverse clutch drum 22*a*. In this range D1, the reverse clutch 22 is not connected and no engine torque is transmitted to the reverse sun gear 18*a*.

D2 range

Hydraulic pressure oil is introduced into the chamber E of the servo-cylinder 38 and, thus, the servo-piston 36 is caused to move towards the chamber D side against the resilient force of the return springs 39. As a result, the servo-piston 36 is removed from its contact with the contact element 46a and the switching means 17 is turned OFF. The servo-piston 36 then punches, via the piston rod 37, the free end of the brake band 24 towards the adjust screw 32, whereby the brake band 24 is compressed to frictionally tighten the reverse clutch drum 22a and fix the reverse sun gear 18a.

D3 range

Hydraulic pressure oil is introduced into both chambers D and E. Owing to the resilient force of the return springs 39 and the difference in area between the surfaces of the servo-piston 36 which face to the chambers D and E, respectively, and on which oil pressures are exerted, the servo-piston 36 is caused to move towards the chamber E side and, as stated above with respect to the D1 range, the brake band 24 is released and, at the same time, the switching means 47 is turned ON. In this case, the reverse clutch is connected so as to cause the reverse sun gears 18a to rotate.

As described above, the state of confinement of the brake band 24, that is the D2 range, may be detected by the OFF signal of the switching means 47, while the state of relief of the brake band 24, that is the D1 or D3 range, may be detected by the ON signal of the switching means 47.

Figure 5:
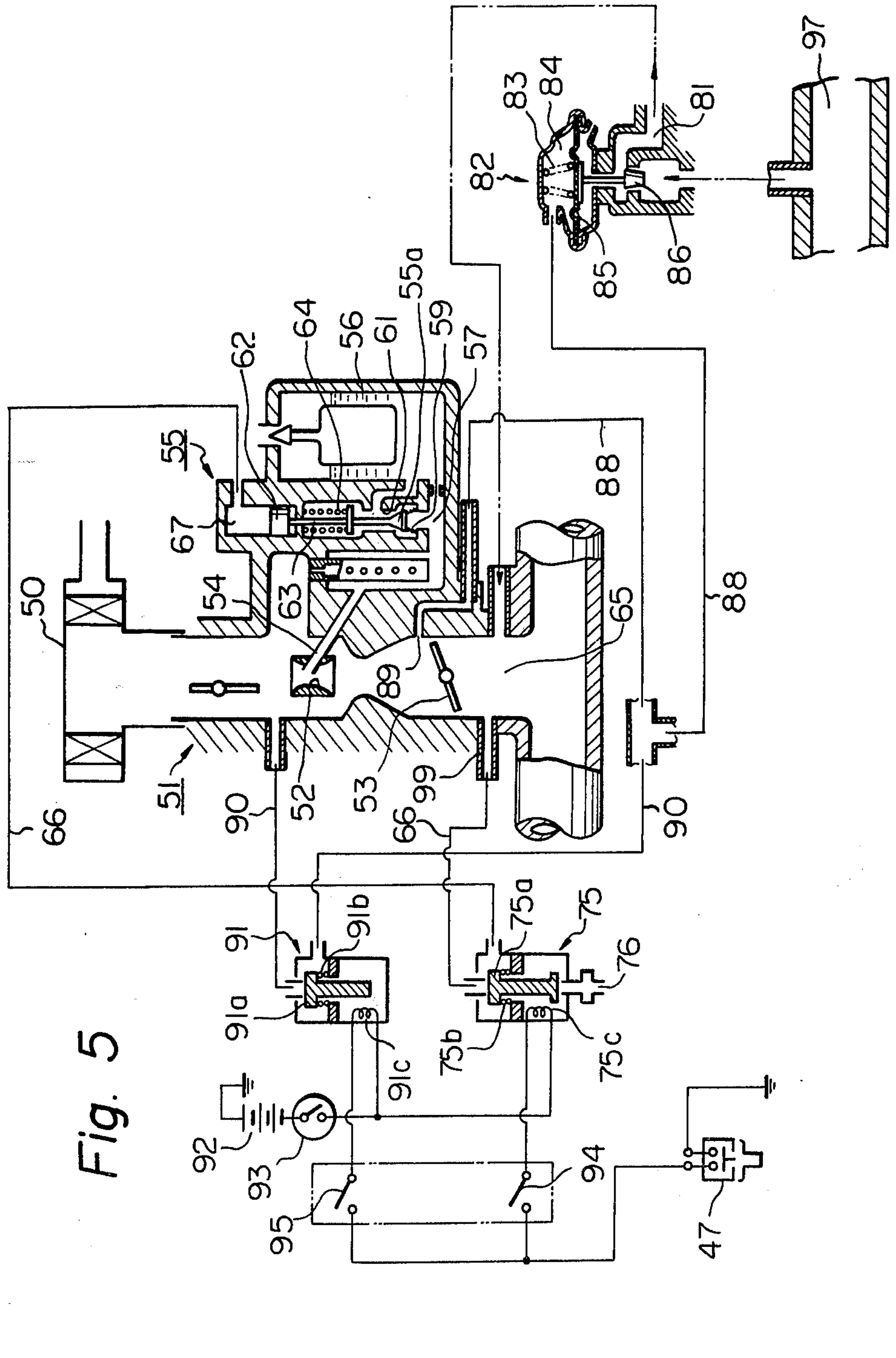
FIG. 5 is a diagramatic view for illustrating the operation of one embodiment of a system in accordance with the invention and FIG. 6 is a table for illustrating the operation of the emission control system in accordance with the invention.
Figure 6:
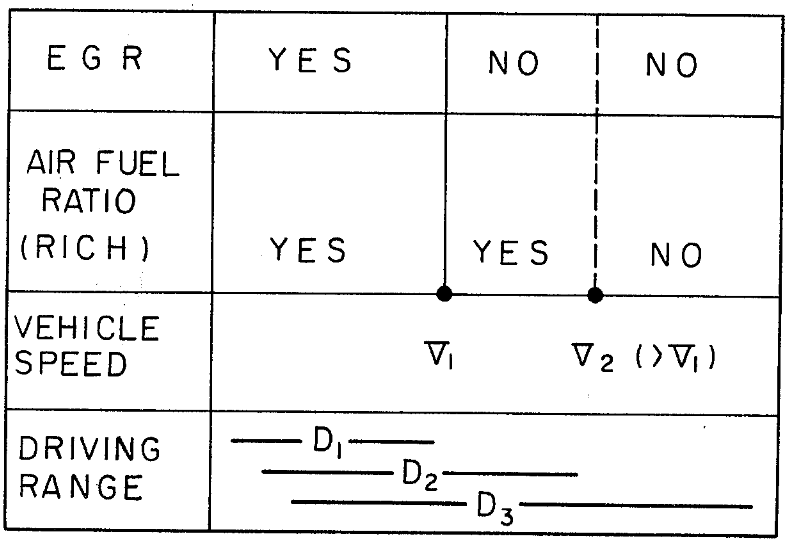

Now referring to FIG. 5, which illustrates one embodiment of an emission control system in accordance with the invention a switching means as described above is used. In addition a carburetor 51 comprises a venturi portion 52, a throttle valve 53, a main nozzle 54 communicated with a fuel float chamber 56 through a main fuel passage 57, and a power device 55, and is equipped with an air-cleaner 50. The power device 55, which may, by opening a power valve 55a, additionally supply fuel from a fuel float chamber 56 to the main nozzle 54 to increase the output, functions in the illustrated embodiment a means for enriching the air-fuel ratio of an air-fuel mixture to be supplied to the engines. The power valve 55a is so urged by valve springs 59 that it may shut a power jet 61 communicating the fuel float chamber 56 with the main fuel passage 57 therethrough. A vacuum piston 62 is disposed so that its piston rod 63 may act against the power valve 55a. The vacuum piston 62 is urged by piston spring 64 so that the piston rod 63 may be brought into contact with and push down the power valve 55a to open it. A vacuum chamber of the power device 55 is communicated via a vacuum passage 66 with a port 99 which is opened to the intake passage 65 downstream of the throttle valve 53 of the caburetor 51. When a vacuum in an intake passage 65 downstream of the throttle valve 53 is introduced through the vacuum passage 66 into a vacuum chamber 67, the vacuum piston 62 is raised against the resiliency of the piston spring 64 thereby closing the power valve 55a. In the vacuum passage 66 there is provided a solenoid valve means 75 having a vacuum relief port 76. When an exciting coil 75c is excited by passing an electric current therethrough, a valve body 75a closes the vacuum relief port 76 and, at the same time, the vacuum passage 66 is communicated with the vacuum chamber 67. When the coil 75c is de-excited by cutting off the electric current, the resilient force the return spring 75b exerts on the valve body 75a terminates the communication of the vacuum passage 66 with the intake passage 65 to communicate the vacuum chamber 67 in the power device 55 with the vacuum relief port 76.

An EGR device for taking a part of the exhaust gas from an exhaust passage 97 and recirculating it via an EGR passage 81 to the intake passage 65 has an EGR valve 82 for controlling the amount of the recirculated gas. The valve 82 is structured so that the vacuum introduced into a vacuum operating chamber 84 may, in the balance of a force exerted on a diaphragm 85 and a resilient force of a diaphragm spring 83 provided in the vacuum operating chamber 84, lift a valve body 86, which is integrally related to the diaphragm 85 and arranged in the EGR passage 81, whereby the effective cross-sectional area of the EGR passage 81 may be controlled.

The vacuum operating chamber 84 of the EGR valve 82 is communicated through a vacuum passage 88 with a port 89 for taking vacuum which opens to the intake passage 65 in the proximity of the throttle valve 53 in the carburetor 51, that is immediately upstream of the throttle valve 53 when the valve is in the idling position (the location of the port 89 relative to the throttle valve 53 changes as the throttle valve 53 opens, eventually becoming downstream of the throttle valve 53). A vacuum relief passage 90 is involved which is branched from the vacuum passage 88.

In the vacuum relief passage 90 there is provided a solenoid valve 91. when the solenoid coil 91c is excited by passing a current therethrough, a valve body 91a is pulled down, whereby the vacuum relief passage 90 is communicated with the vacuum operating chamber 84 in the EGR valve 82. Whereas when the coil 91c is de-excited by cutting off the electric current, the resilient force the return spring 91b exerts on the valve body 91a terminates the communication of the vacuum relief passage 90 with the vacuum operating chamber 84 in the EGR valve 82.

Electric circuits for exciting the above-mentioned solenoid valves 75 and 91 can be as follows.

For the solenoid valve 75 for the control of the air-fuel ratio, an electric source 92, a key switch 93, the coil 75c of the valve 75, a vehicle speed switch 94 and the switching means 47 are arranged in series, whereas for the electro-magnetic valve 91, with the above-mentioned circuit is connected a series circuit comprising the other vehicle speed switch 95 and coil 91c so that the vehicle speed switch 95 and the coil 91c are arranged in pallarel to the vehicle switch 94 and the coil 75c.

The vehicle speed switches 94 and 95 may be known vehicle speed switches such as speed sensors of high frequency type or lead switch type which are widely used in speed meters. The switches are set so that the switch 95 for the EGR device may respond to a first predetermined vehicle speed V1 of about 40 to 60 km/hr or higher and be turned ON, and the switch 94 for the control of the air-fuel ratio may respond to a second predetermined vehicle speed V2, which is higher than the first pedetermined vehicle speed V1, or higher and become be turned ON.

The illustrated system operates as follows.

D1 and D2 ranges

The solenoid valves 75 and 91 are de-excited because the vehicle switches 94 and 95 are OFF and, thus, the exciting circuits of these valves are opened irrespectively of whether the switching means 47 is ON or OFF.

Accordingly, the solenoid valve 75 shuts the communication of the vacuum passage 66 and opens the vacuum relief port 76, permitting the atmospheric air to be introduced into the vacuum chamber 67 in the power device 55. Consequently, the vacuum piston 62 via the piston rod 63, pushes down the power valve 55*a* by the resilient force of the spring 64 so as to open the power jet 61. As a result, fuel is additionally supplied from the fuel float chamber 56 through the power jet 61 into the main fuel passage 57 so that the air-fuel ratio of the air-fuel mixture to be taken into the engines become richer than the stoichiometric air-fuel ratio.

On the other hand, the solenoid valve 91 shuts the vacuum relief passage 90 by the action of the resilient force of the spring 91*b* so that a strong vacuum is introduced through the port 89 for taking vacuum into the vacuum operating chamber 84 in the EGR valve 82, lifting the valve body 86. As a result, the effective cross-sectional area of the EGR passage 81 is increased so as to increase the amount of the recirculated exhaust gas and in turn the EGR ratio.

By the enrichment of the air-fuel ratio and the increase in the EGR ratio so achieved the NOx component can be reduced in the case when a vehicle is driven in a city within the low or intermediate driving ranges.

D3 range with a vehicle speed of from V1 (40–60 km/hr) to V2 (V2>V1)

With the switching means 47, the vehicle speed switch 94 and the vehicle speed switch 95 being ON, OFF and ON, respectively, the solenoid valve 75 is de-excited while the solenoid valve 91 is excited.

Accordingly, the power device 55 operates, as described hereinabove with respect to the D1 and D2 ranges, so that the air-fuel ratio of the air-fuel mixture to be taken into the engines may be set richer than the stoichiometric acid-fuel ratio.

On the other hand, owing to the excitation of the solenoid valve 91 the valve body 91*a* is pulled down so as to communicate the vacuum relief passage 90 with the vacuum operating chamber 84 in the EGR valve 82. Thus, the vacuum from the vacuum passage 88 is released, and the pressure in the vacuum operating chamber 84 becomes atmospheric. The diaphragm 85 is then pushed down by the action of the resilient force of the spring 83 so that the valve body 86 shuts the EGR passage 81 or reduces the effective cross-sectional area thereof. As a result, the amount of the recirculated exhaust gas becomes zero or reduced, leading to the reduction in the EGR ratio.

Thus, in the high driving (D3) range, if the vehicle speed is lower than V2, the generation of NOx can be controlled by setting the air-fuel ratio on the rich side, and at the same time the output and fuel consumption efficiency can be enhanced by reducing the EGR ratio.

D3 range with a vehicle speed of at least V2

The vehicle speed switch 94 is turned ON to operate the solenoid valve 75. The valve body 75*a* is pulled down so as to shut the vacuum relief port 76 and communicate the vacuum passage 66. Thus, the vacuum in the intake passage 64 downstream of the throttle valve 53 is caused to prevail in the vacuum chamber 67 of the power device 55, and attracts the vacuum piston 62 against the resilient force of the spring 64 whereby passing of the power valve 55*a* by the piston rod 63 is released. In consequence, the power valve 55*a* is urged by the resilient force of the springs 59 as to clog the power jet 61 and in turn shut the fuel flow through said jet 61. As the result, a supply of the additional fuel to the main fuel passage is stopped, whereby the air-fuel ratio of the intake air-fuel mixture to be taken into the engines is returned to a normally set valve, that is the air-fuel ratio is released from being set on the rich side.

Thus, in the high driving range with a vehicle speed of at least V2 it is expected that the fuel consumption efficiency will be further enhanced by, in addition to reducing the EGR ratio, releasing the air-fuel ratio from being set on the rich side.

As described herein, the high driving range can be exactly detected in accordance with the invention by an electrical detection of mechanical displacement of the brake servo in the automatic transmission combined with a detection of the vehicle speed by means of vehicle speed switches. Further, in the low and intermediate driving (D1 and D2) ranges where NOx is generated in considerable amounts, emission control can be carried out by increasing the EGR ratio and setting the air-fuel ratio of the intake air-fuel mixture to be taken into the engines richer than the stoichiometric air-fuel ratio thereby suppressing the generation of NOx. Also, in the high driving range and where the vehicle speed is relatively low, in addition to the effective control of NOx generation, it is possible to enhance the output and fuel economy by reducing the EGR ratio. Finally, in the high driving range and where the vehicle speed is relatively high the fuel economy may be further enhanced by releasing the air-fuel ratio from being set on the rich side.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An emission control system in a motor vehicle having an engine and equipped with an automatic transmission having a band servo wherein a brake band may make a part of planetary gear units tightened or released by the action of a servo piston, said emission control system comprising:

switching means for detecting the tightening state of the brake band where said transmission is in the intermediate driving range and for detecting the releasing state of the brake band where said transmission is in the low and the high driving ranges;

a first vehicle speed switch for detecting whether the vehicle speed is equal to or higher than a first predetermined value;

a second vehicle speed switch for detecting whether the vehicle speed is equal to or higher than a second predetermined value which is higher than said first predetermined value;

means for enriching the air-fuel ratio of an air-fuel mixture in an intake passage of the engine, and exhaust gas recirculating means for recirculating a part of the exhaust gas into said intake passage, said switches and means being so arranged that; when said first vehicle speed switch detects the vehicle speed which is lower than said first predetermined value, the air-fuel ratio of the air-fuel mixture in the intake passage is set richer than the stoichiometric air-fuel ratio by means of said enriching means and at the same time the exhaust gas recirculation ratio is made high by means of said exhaust gas recirculating means; when said switching means has detected the low and high driving ranges, and said first vehicle speed switch has detected the vehicle speed which is equal to or higher than said first predetermined value, the exhaust gas recirculation ratio is made low, and; when said switching means has detected the low and high driving ranges, and said second vehicle speed switch has detected the vehicle speed which is equal to or higher than said second predetermined value, the enriching action of said means for enriching the air-fuel ratio is released.

2. An emission control system as claimed in claim 1, wherein said switch means may be brought into contact with the servo-piston or a connecting member attached thereto at the end of the stroke of said servo-piston and which may close or open an electric circuit upon contact with or removal from said servo-piston or said connecting member, whereby the state of the operation of said band servo system may be detected in accordance with the closing or opening of said detecting switch.

3. An emission control system as claimed in claim 1, wherein said enriching means comprises a vacuum operated power valve for feeding an additional fuel into the intake passage.

4. An emission control system as claimed in claim 3, wherein said enriching means further comprises valve means means for establishing the fluid connection between said vacuum operated power valve and a vacuum source in response to the output signals of said second vehicle speed switch and said switching means.

5. An emission control system as claimed in claim 1, wherein said exhaust gas recirculating means comprises a vacuum operated exhaust gas recirculating valve which is connected via a vacuum passage to a vacuum port opening into the intake passage at a position located upstream of a throttle valve when the throttle valve is in the idling position and opening into the intake passage at a position located downstream of the throttle valve when the throttle valve is opened.

6. An emission control system as claimed in claim 5, wherein said exhaust gas recirculating means further comprises valve means for bleeding air into said vacuum passage to decrease the vacuum level in the vacuum passage so that the exhaust gas recirculation ratio is reduced, in response to the output signals of said first vehicle speed switch and said switching means.

* * * * *